July 13, 1926.
J. T. JANETTE
BEARING FOR MOTORS
Filed Feb. 25, 1924
1,592,665
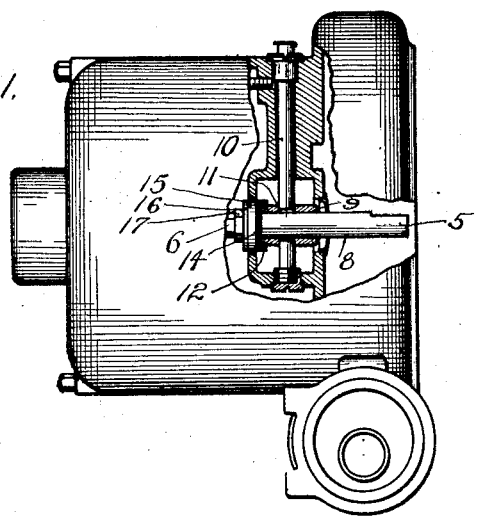
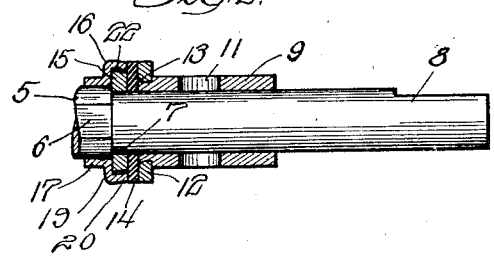
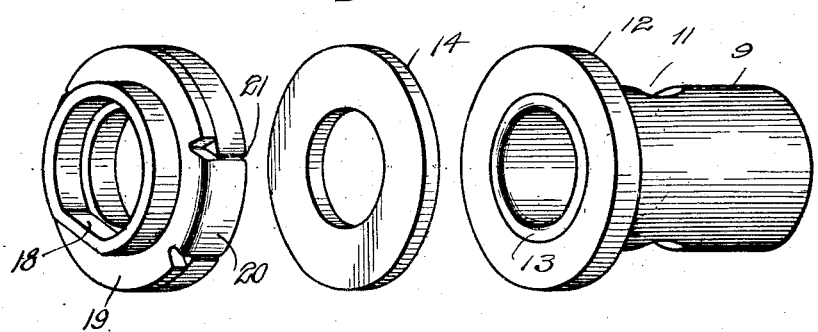
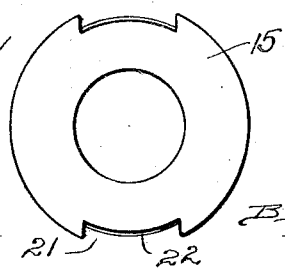
Inventor:
John T. Janette
By Glenn S. Noble
Atty.

Patented July 13, 1926.

1,592,665

UNITED STATES PATENT OFFICE.

JOHN T. JANETTE, OF CHICAGO, ILLINOIS.

BEARING FOR MOTORS.

Application filed February 25, 1924. Serial No. 694,920.

This invention relates to bearings adapted to furnish not only a transverse support for a shaft but also to receive the end thrust thereof. While it is particularly applicable for motors in which the armature shaft may have an end thrust due to its standing in a vertical position or to driving a fan, worm gear or the like, it may of course be utilized for any purpose to which it is adapted.

The objects of this invention are to provide a bearing of the thrust type which may be cheaply constructed but which will be particularly efficient and long lived in operation; to provide a thrust bearing which may be applied to the shaft without drilling or cutting the same and which will be self-aligning; to provide a thrust bearing having a minimum number of parts; and in general to provide such an improved device as will be described more fully hereinafter.

In the accompanying drawing illustrating this invention,

Figure 1 is a side view of a motor with parts broken away to show the bearing;

Figure 2 is an enlarged sectional view of the bearing;

Figure 3 is a perspective view showing the several parts of the bearing; and

Figure 4 is a front view of one of the bearing washers.

As shown in these drawings the motor 4 is provided with an armature shaft 5. In the construction of such motors I have found it desirable to flatten the part of the shaft which carries the armature as shown at 6 and there is a shoulder 7 where the shaft is turned down or reduced to form a journal portion 8. The bearing comprises a sleeve or cylindrical portion 9 which is mounted in the housing in any suitable manner and which is prevented from turning as by means of an oil pipe 10 which projects into a hole 11 in the sleeve. This sleeve or bearing portion is preferably made of bronze or other suitable bearing material and is provided on its inner end with a steel washer or thrust bearing ring 12 which is rigidly secured thereto in any suitable manner as by riveting or spinning a portion of the collar into the enlarged portion of the hole through the washer as indicated at 13. A thrust ring or washer 14 fits over the journal 8 and engages with the ring 12. The ring or washer 14 is formed of fiber or material commonly known as gear stock, different manufactures of such stock being known as "condensite," "formica," "bakelite," etc. The washer 14 is engaged by a second metallic washer or bearing member 15 which is also preferably formed of steel and abuts against the shoulder 7. The ring or washer 15 fits freely on the journal 8 and is somewhat loosely supported and turned or driven so that it may align itself with the shoulder and with the washer 14 in order to provide a self-aligning bearing. This is accomplished by means of a washer turning member 16 comprising a tubular or cylindrical portion 17 which fits over the enlarged part of the shaft 5 and which has a flattened portion 18 which engages with the flattened portion 6 of the shaft so that the washer turning member will rotate therewith. This washer turning member has an outwardly projecting flange 19 which is provided with driving lugs or projections 20 which engage with recesses 21 in the edges of the ring or washer 15. The bottom surfaces of the recesses are tapered as shown at 22 and the inner faces of the lugs are correspondingly tapered in order to hold the washer in engagement with the washer turning member 16 as well as being rotated thereby.

When the bearing is to be applied to the shaft, the washer turning member 16 is slipped into position so that is will be rotated by the shaft and the bearing ring 15 is pressed against the shoulder, these parts being made to fit sufficiently free so that they do not need to be forced into position and the ring will align itself on the shaft. By using the fibre washer 14 between the adjacent metal washer or bearing members 12 and 15, I provide a bearing which I have found to be particularly efficient in that there is but little friction and also one which is not apt to become readily worn. It will be noted that the bearing is arranged in the housing in such manner that it will receive sufficient lubrication. As most of the parts comprising the bearing may be stamped or formed from sheet material, the parts may be cheaply made.

Having thus described my invention, which however, I do not wish to limit to the exact arrangement shown and described, as it may require modification for different types of motors or axles, what I claim and desire to secure by Letters Patent is:

1. The combination with an axle having a flattened portion adjacent to the journal of a bearing washer, a washer turning member fitting over the axle and having a flattened portion to engage with the flattened portion thereof, and coacting with said washer to drive the same, a second washer mounted on the journal and engaging with said bearing washer, a bearing ring engaging with the opposite side of the second named washer, and means for rigidly supporting the bearing ring.

2. A thrust bearing comprising a washer formed of fibrous material, a metallic ring engaging with one side of the washer, means for rigidly supporting said ring, a second metallic ring engaging with the opposite face of the washer and means for driving said second ring from the shaft, said second ring being loosely mounted in order that it may align itself against the shoulder on the shaft.

3. The combination of a shaft having a shoulder between the main portion and the journal, of a bearing washer having recesses therein, a washer driving member engaging with the main portion of the shaft and adapted to be driven thereby, lugs on said washer driving member engaging with the recesses in the bearing washer, a fibre washer engaging with the bearing washer, a second bearing washer, and a bearing sleeve supporting said second bearing washer.

4. The combination with a motor shaft having a flattened main portion adjacent to the journal, of a washer turning member engaging with said flattened portion and adapted to turn with the shaft, lugs on said washer turning member, a metal washer having recesses for receiving said lugs, said metal washer being adapted to fit loosely over the journal and against the shoulder at the end of the main portion of the shaft, an intermediate bearing ring formed of gear stock, a bearing sleeve and a bearing ring secured to the end of the sleeve and adapted to engage with the intermediate ring, substantially as described.

5. The combination with a motor shaft having a flattened main portion adjacent to the journal, of a metal washer having recesses therein, a washer driving member engaging with said flattened portion and adapted to turn with the shaft, lugs on said washer driving member which engage with said recesses in the metal washer, said metal washer being adapted to fit loosely over the journal and against the shoulder at the end of the main portion of the shaft, an intermediate bearing ring formed of gear stock, a bearing sleeve, and a bearing ring secured to the end of the sleeve and adapted to engage with the intermediate bearing ring, substantially as described.

6. The combination with a shaft having a shoulder between the main portion and the journal, of a sleeve fitting over the main portion and adapted to be driven thereby, a flange on said sleeve, lugs projecting from said flange, a bearing washer fitting freely over the journal and having recesses for receiving said lugs, the bottoms of said recesses being bevelled whereby the lugs will hold the ring in engagement with the driving member, a fibre washer engaging with the ring, a second metallic ring engaging with the opposite face of the washer, a journal sleeve supporting said last named metallic ring and means for preventing the rotation of said journal sleeve.

JOHN T. JANETTE.